(12) United States Patent
Wang

(10) Patent No.: US 7,530,818 B1
(45) Date of Patent: May 12, 2009

(54) SIGNAL ADAPTOR BOX

(75) Inventor: Chang-Pin Wang, Yung-Ho (TW)

(73) Assignee: Sure-Fire Electrical Corporation, Taipei Hsien (TW)

( * ) Notice: Subject to any disclaimer, the term of this patent is extended or adjusted under 35 U.S.C. 154(b) by 0 days.

(21) Appl. No.: 12/039,721

(22) Filed: Feb. 28, 2008

(51) Int. Cl.
*H01R 12/00* (2006.01)

(52) U.S. Cl. ................................ 439/76.1; 439/638

(58) Field of Classification Search ............. 439/76.1, 439/638
See application file for complete search history.

(56) References Cited

U.S. PATENT DOCUMENTS

| | | | |
|---|---|---|---|
| 6,213,782 B1* | 4/2001 | Derstine | 439/31 |
| 6,338,656 B1* | 1/2002 | Oliphant et al. | 439/676 |
| 6,364,535 B1* | 4/2002 | Coffey | 385/53 |
| 6,488,542 B2* | 12/2002 | Laity | 439/676 |
| 6,554,650 B2* | 4/2003 | Kayworth et al. | 439/638 |
| 6,843,689 B2* | 1/2005 | Coniff | 439/638 |
| 6,941,395 B1* | 9/2005 | Galang et al. | 710/65 |
| 7,048,550 B2* | 5/2006 | Hyland et al. | 439/67 |
| 7,321,946 B2* | 1/2008 | Olson | 710/300 |
| 7,338,327 B2* | 3/2008 | Sticker et al. | 439/638 |
| 2004/0087214 A1* | 5/2004 | Cho | 439/638 |
| 2004/0136456 A1* | 7/2004 | Ogden | 375/240.01 |
| 2006/0010274 A1* | 1/2006 | Olson | 710/300 |
| 2007/0190855 A1* | 8/2007 | Meister et al. | 439/595 |
| 2007/0190857 A1* | 8/2007 | Galang et al. | 439/607 |
| 2007/0197053 A1* | 8/2007 | Liao | 439/11 |
| 2007/0232132 A1* | 10/2007 | Ling et al. | 439/541.5 |
| 2008/0050975 A1* | 2/2008 | Liao | 439/660 |
| 2008/0146049 A1* | 6/2008 | Hashiguchi et al. | 439/65 |
| 2008/0146063 A1* | 6/2008 | Lin | 439/329 |
| 2008/0182457 A1* | 7/2008 | Wu | 439/626 |

* cited by examiner

*Primary Examiner*—Ross N Gushi

(57) ABSTRACT

A signal adapter box for use to extend the signal transmission distance between a signal source and a video output device is disclosed to include a housing, which has a first opening and a second opening for the insertion of a HDMI plug and a RJ-type plug respectively, a circuit board mounted in the housing, a HDMI jack mounted on the circuit board and abutted against the first opening of the housing for receiving a HDMI plug of a HDMI cable, and RJ-type jacks mounted on the circuit board for signal transmission with the HDMI jack and abutted against the second opening of the housing for receiving a RJ-type plug of a RJ-type transmission cable respectively.

8 Claims, 7 Drawing Sheets

SIGNAL ADAPTOR BOX

BACKGROUND OF THE INVENTION

1. Field of the Invention

The present invention relates to signal adapters and more particularly, to a signal adapter box for use with RJ-type transmission cables to extend the signal transmission distance between a HDMI signal source and a video output device.

2. Description of the Related Art

Following fast development of high technology, improved quality of electronic products have been continuously created and have appeared on the market. From early black and white TVs to later color picture tube TVs and the current plasma and LCD TVs, we see a great improvement in picture quality. An advanced plasma or LCD TV provides outstanding sharpness and high contrast for displaying high quality images. However, TV programs may not satisfy all people. Ampex introduced the Ampex VRX-1000, the first commercially successful videotape recorder, in 1956. In late 1970s, European and Japanese companies developed more technically advanced machines with more accurate electronic timers and greater tape duration, that the VCR started to become a mass market consumer product. In 1993, the VCD standard was created. In the late 1990s and early 2000s, DVD gradually overtook VHS as the most popular format for playback of prerecorded video.

VCD/DVD players must use a transmission cable to transmit signal to a TV for display. Earlierly, transmission cables of the video interface standard of DVI (Digital Video Interface) are used to maximize the visual quality of digital display devices such as flat panel LCD computer displays and digital projectors. Further, Intel i750 VLSI is the common choice for image compression and decompression. However, because DVI standard is simply for transmission of images but not for voice, an extra audio signal line is necessary. In view of this drawback, the compact audio/video connector interface of HDMI (High Definition Multimedia Interface) was developed for transmitting uncompressed digital streams. HDMI is backward-compatible with the single-link DVI carrying digital video used on modern computer monitors and graphics cards. In 2002, Intel developed HDCP (High-bandwidth Digital Content Protection) to control digital audio and video content as it travels across DVI (Digital Video Interface), HDMI (High Definition Multimedia Interface), or UDI (United Display Interface) connections. HDMI supports digital video formats of SXGA, UXGA, SDTV and HDTV as well as digital audio formats of CD, DVD-Audio and Dolby Digital/DTS. It also supports up to 165 Mpixel/s video (1080p60 Hz or UXGA) and 8-channel/192 kHz/24-bit audio and 48-bit xvYCC with Deep Color or over one billion colors with maximum bandwidth speed 5 Gbps.

The present time is the age of information explosion. Many exhibitions, conferences and other activities are performed daily in different places to introduce new products or designs to the public. In these places, audio output devices and/or big scale display screens are used for audio and video outputs to call people' attention. For the transmission of a video signal from a signal source to a display screen, a HDMI cable is usually used to assure video display quality. However, a HDMI cable has its transmission limitation. When the transmission distance surpasses 10 meters, the problem of signal attenuation will occur. Therefore, the location of the display screen must be limited to a range within 10 meters from the signal source.

SUMMARY OF THE INVENTION

The present invention has been accomplished under the circumstances in view. It is the main object of the present invention to provide a signal adapter box, which is practical for use with RJ-type transmission cables to extend the signal transmission distance between a HDMI signal source and a video output device. It is another object of the present invention to provide a signal adapter box, which has a compact and strong size for carrying and for installation in any place conveniently to extend the signal transmission distance between a HDMI signal source and a video output device. It is another object of the present invention to provide a signal adapter box, which has means to indicate the signal transmission status.

To achieve these and other objects and according to one aspect of the present invention, the signal adapter box comprises a housing and an electric module. The housing has a first opening and a second opening for the insertion of a HDMI plug and a RJ-type plug respectively. The electric module comprises a circuit board mounted inside the housing, a HDMI jack mounted on the circuit board and abutted against the first opening of the housing for receiving a HDMI plug of a HDMI cable, and RJ-type jacks mounted on the circuit board for signal transmission with the HDMI jack and abutted against the second opening of the housing for receiving a RJ-type plug of a RJ-type transmission cable respectively. According to another aspect of the present invention, the electric module further comprises a processor chip installed in the circuit board and electrically connected with the HDMI jack and the RJ-type jacks for processing inputted HDMI signal through a compensation and amplification process. According to still another aspect of the present invention, the electric module further comprises a light emitting device installed in the circuit board and controlled by the processor chip to indicate the signal transmission status of the signal adapter box.

DETAILED DESCRIPTION OF THE PREFERRED EMBODIMENT

Figure 1:
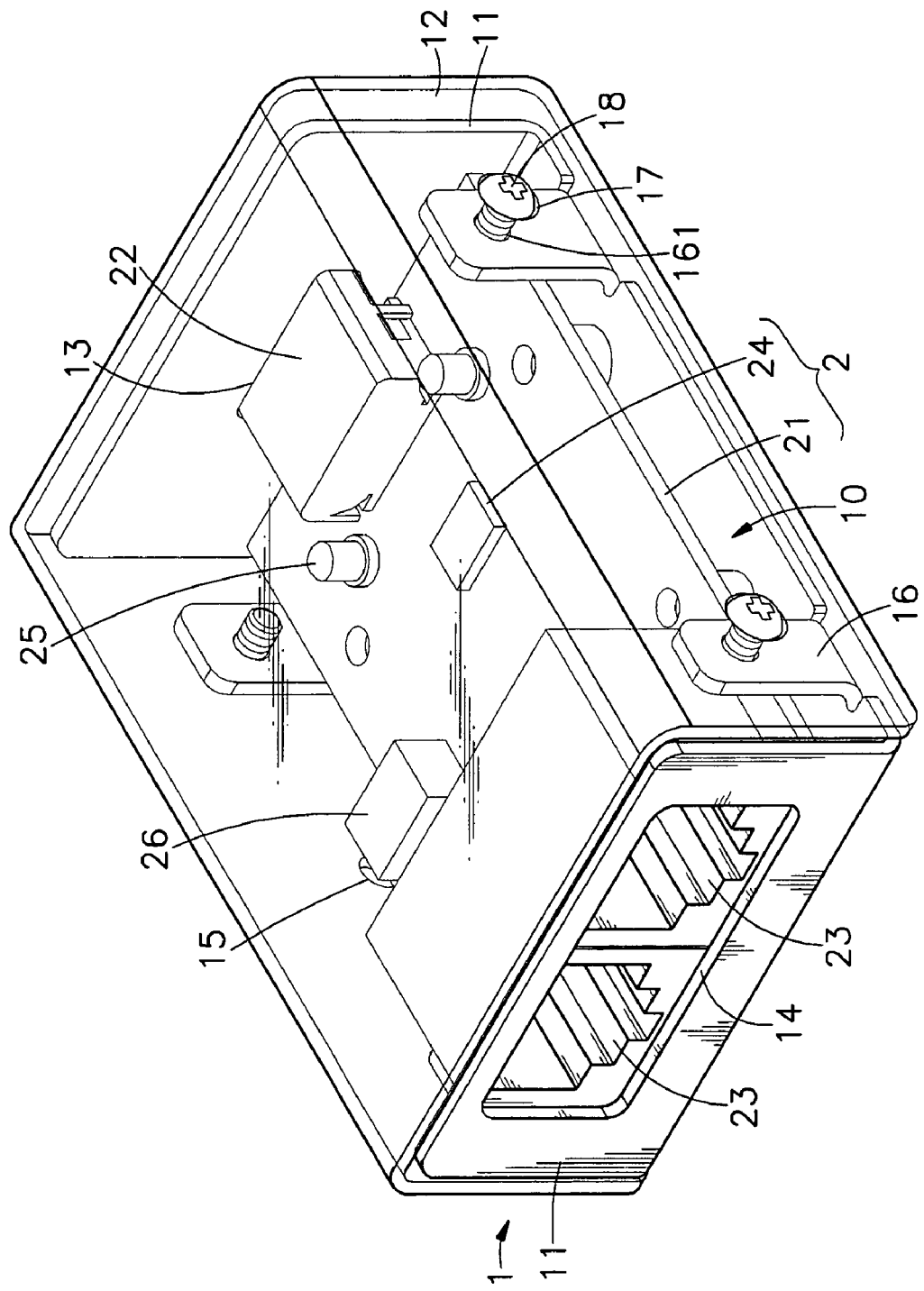
FIG. 1 is a perspective view of a signal adapter box in accordance with a first embodiment of the present invention.

Referring to FIGS. 1~4, a signal adapter box in accordance with a first embodiment of the present invention is shown comprising a housing 1 and an electric module 2.

The housing 1 is comprised of a base frame 11 and a cover 12, defining an accommodation chamber 10. The housing 1 has a first opening 13 and a second opening 14 respectively disposed at the front and rear sides thereof in communication with the accommodation chamber 10, and an insertion hole 15 at one lateral side.

The electric module 2 comprises a circuit board 21. The circuit board 21 carries a HDMI (High Definition Multimedia Interface) jack 22 and a plurality of RJ-type jacks 23 on the top wall at two opposite sides, a processor chip 24 on the top middle of the top wall, at least one light emitting device 25 on the top wall at a suitable location, and a power jack 26 on the top wall near one lateral side. The light emitting device 25 and the power jack 26 are respectively electrically connected to the processor chip 24.

During installation, the electric module 2 is mounted in the accommodation chamber 10 inside the housing 1 to have the HDMI jack 22, the RJ-type jacks 23 and the power jack 26 be respectively abutted against the first opening 13, the second opening 14 and the insertion hole 15 of the housing 1.

Figure 2:
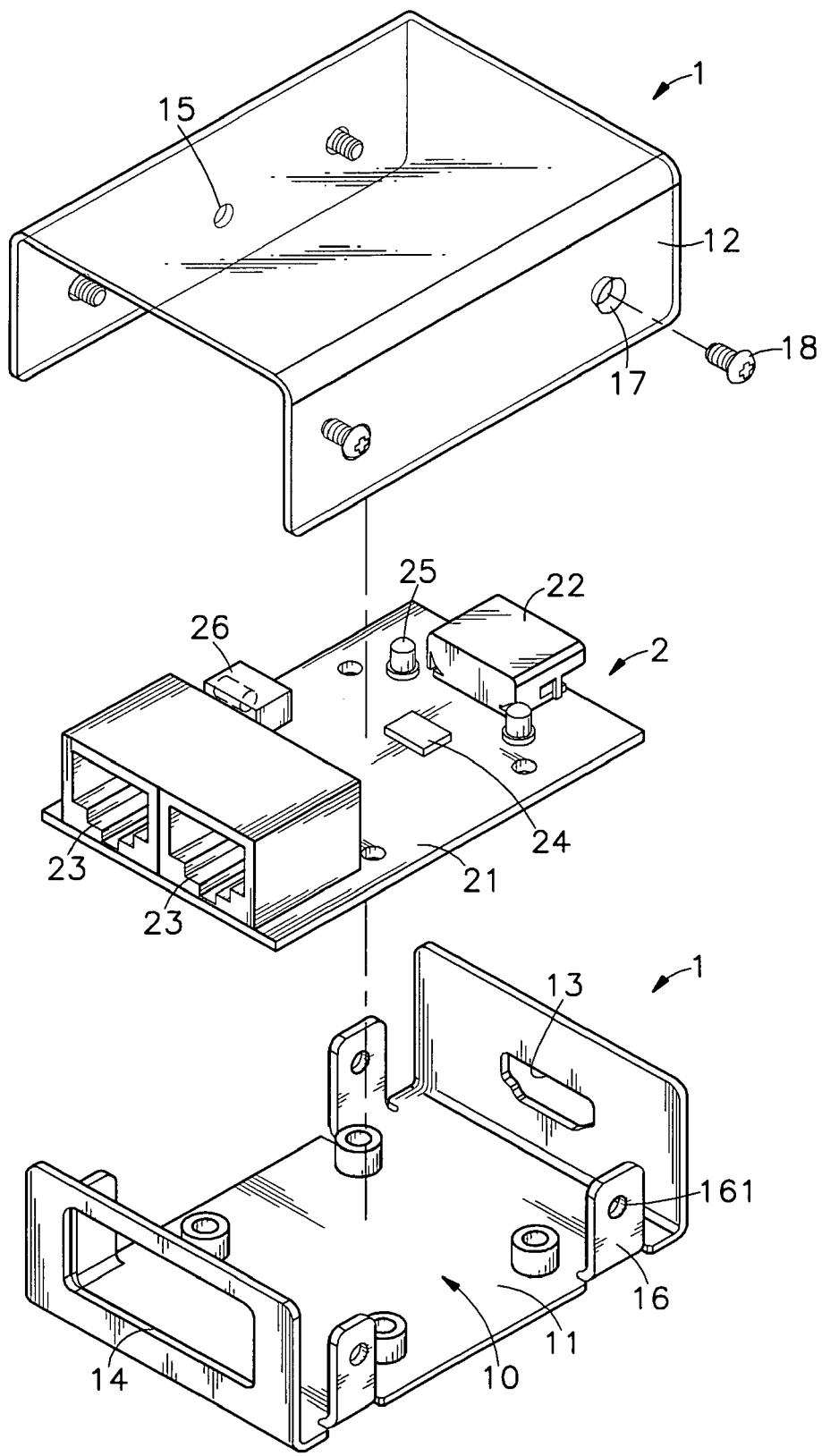
FIG. 2 is an exploded view of the signal adapter box in accordance with the first embodiment of the present invention.
Figure 3:
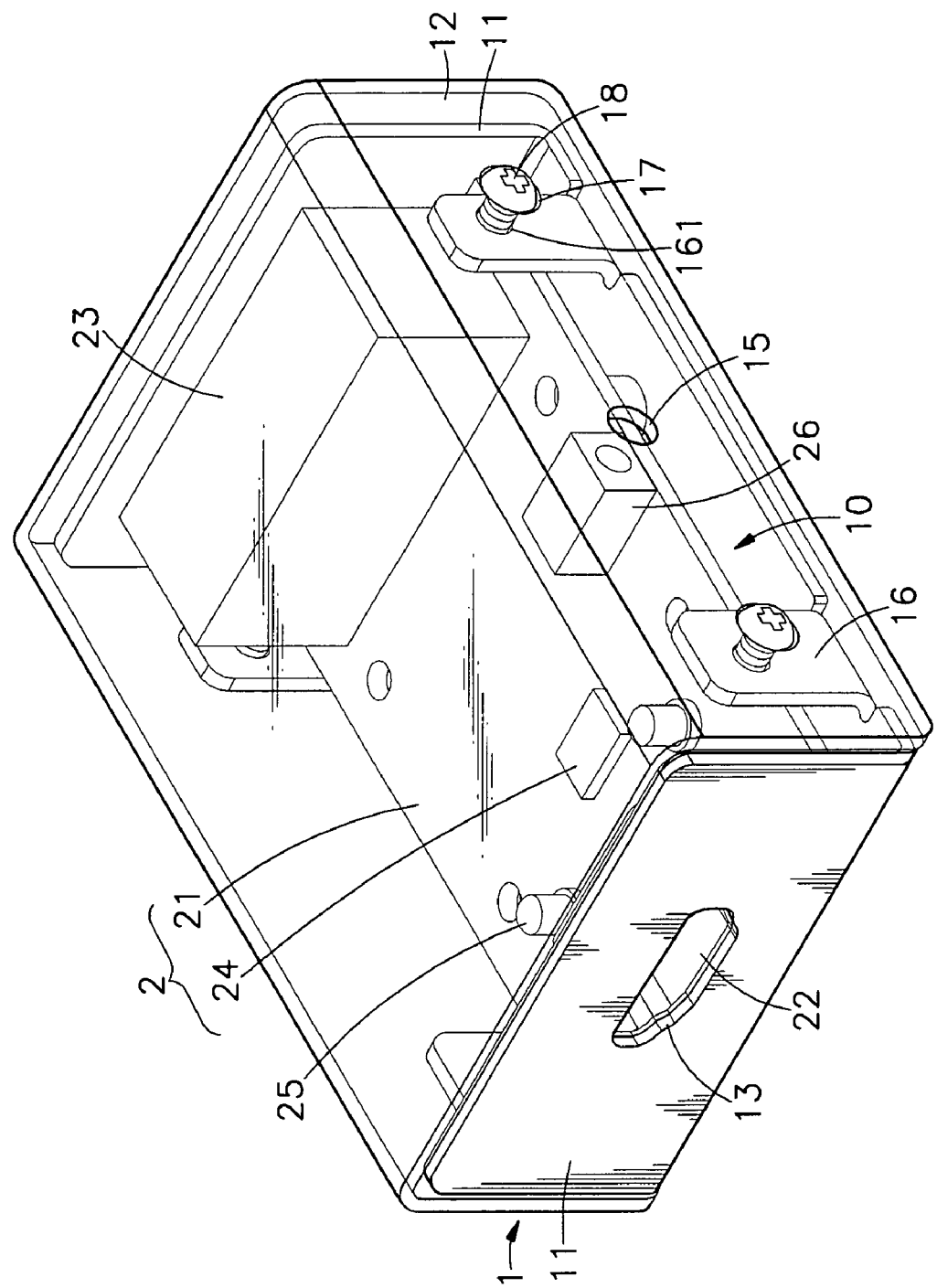
FIG. 3 corresponds to FIG. 1 when viewed from another angle.
Figure 4:
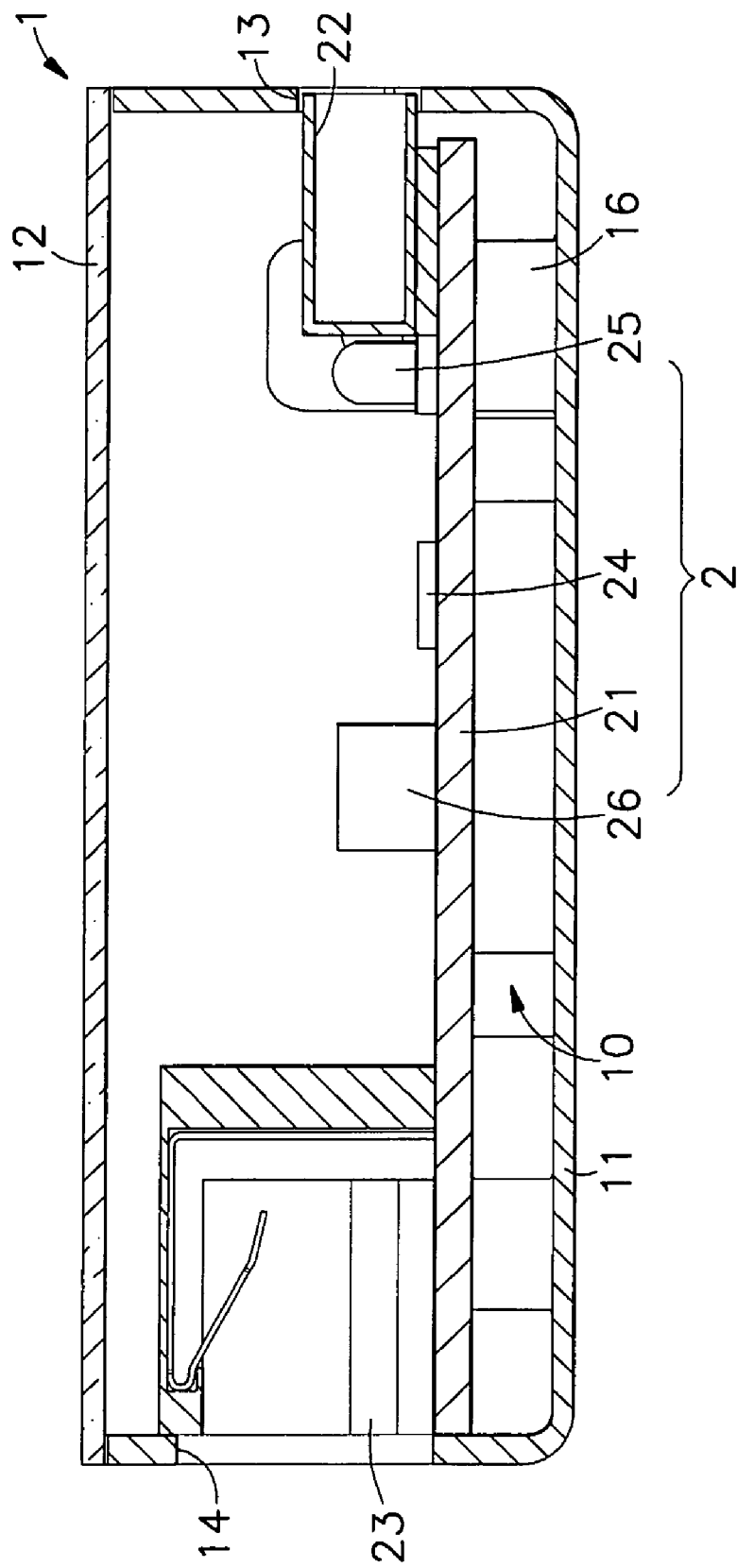
FIG. 4 is a sectional side view of the signal adapter box in accordance with the first embodiment of the present invention.
Figure 5:
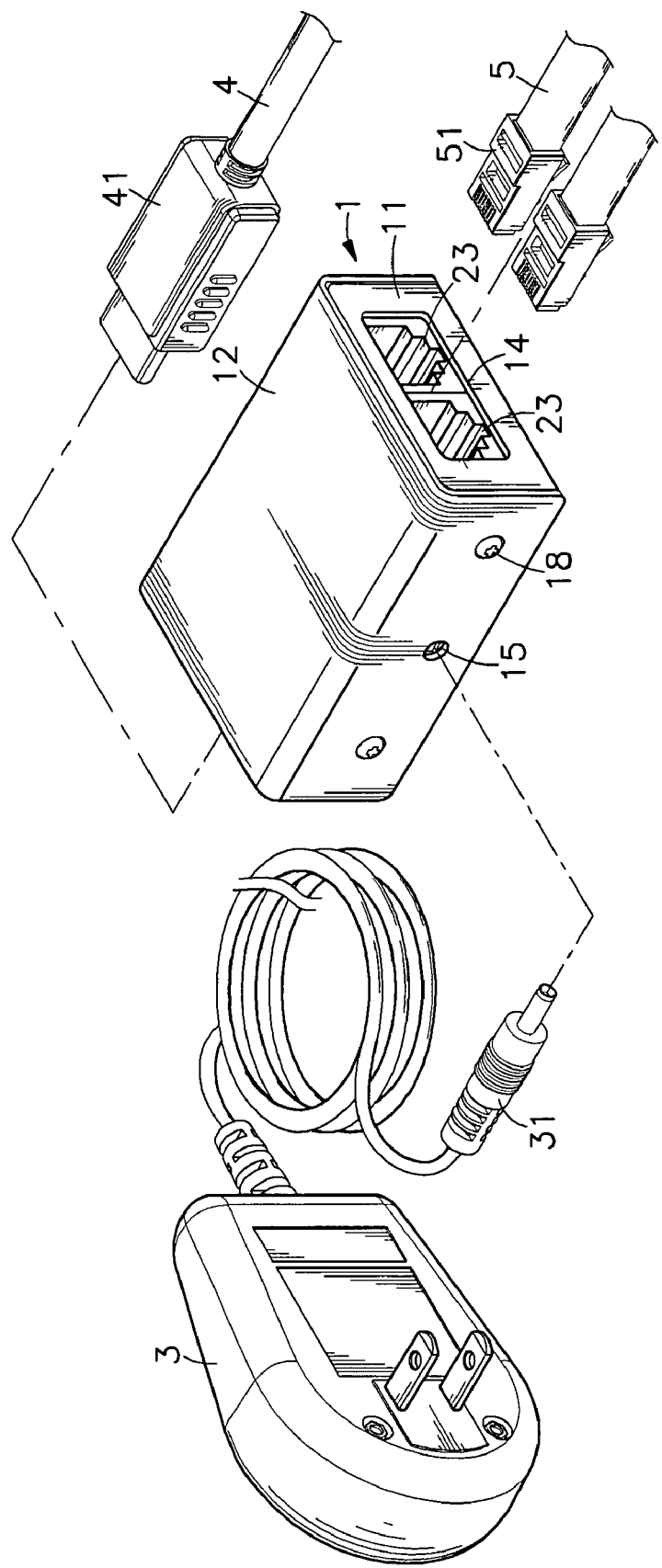
FIG. 5 illustrates a status of use of the signal adapter box in accordance with the first embodiment of the present invention before connection of the power cable and related transmission cables.

Referring to FIGS. 2 and 5, when the signal adapter box is in use, a power output plug 31 of a power adapter 3 is inserted through the insertion hole 15 of the housing 1 into the power jack 26 of the electric module 2 so that the power adapter 3 convert city power supply into the desired voltage level for the electric module 2. Thereafter, a plug 41 at one end of a HDMI cable 4 and a plug 51 at one end of each of two RJ-type transmission cables 5 are respectively inserted through the first opening 13 and the second opening 14 of the housing 1 into electric connection with the HDMI jack 22 and the RJ-type jacks 23 respectively.

The HDMI cable 4 transmits an input signal from a signal source to the HDMI jack 22 and then the processor chip 24, which processes the input signal through a signal compensation and amplification process and then transmits the processed signal to the RJ-type jacks 23 for further output through the RJ-type transmission cables 5. Because signal transmission may cause signal attenuation, and the extent of signal attenuation will become worse when the transmission distance is increased. By means of the processor chip 24 to compensate and amplify input signal, the signal quality is improved, preventing signal distortion or interruption and achieving signal stability during transmission.

Further, during signal transmission, the processor chip 24 controls the at least one light emitting device 25 to give a visual indication, indicating the signal transmitting status of the signal adapter box. The housing 1 or the cover 12 of the housing 1 can be made of a light transmissive material so that the light of the at least one light emitting device 25 goes through the housing 1 to the outside. In case of a failure during the use of the signal adapter box, a user can immediately know the situation subject to the indication of the at least one light emitting device 25, so that the necessary repair work can be performed quickly.

Figure 6:
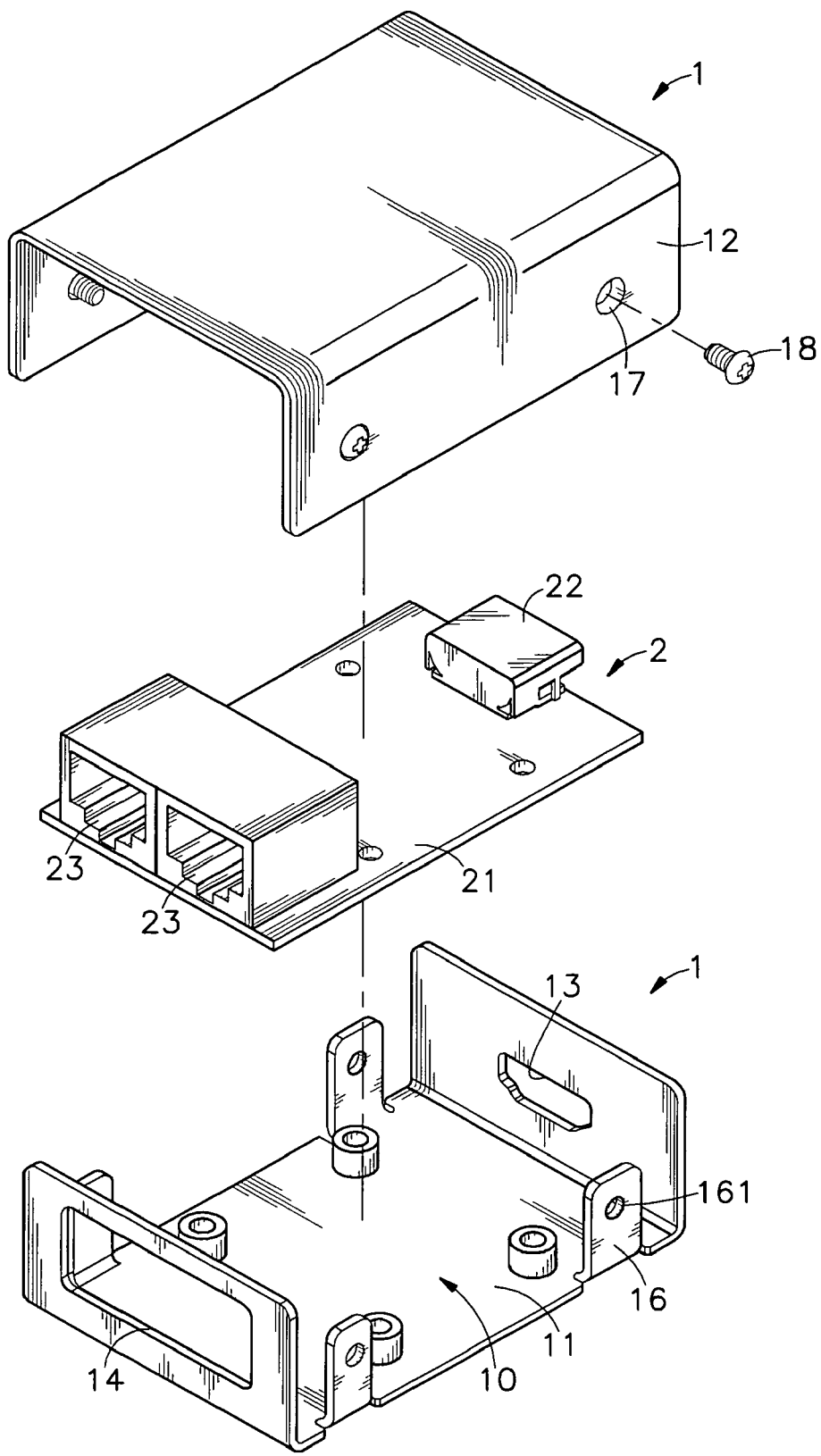
FIG. 6 is an exploded view of a signal adapter box in accordance with a second embodiment of the present invention.

FIG. 6 is an exploded view of a signal adapter box in accordance with a second embodiment of the present invention. This second embodiment is substantially similar to the aforesaid first embodiment with the exception that the electric module 2 of this second embodiment eliminates the aforesaid processor chip 24, at least one light emitting device 25 and power jack 26.

Figure 7:
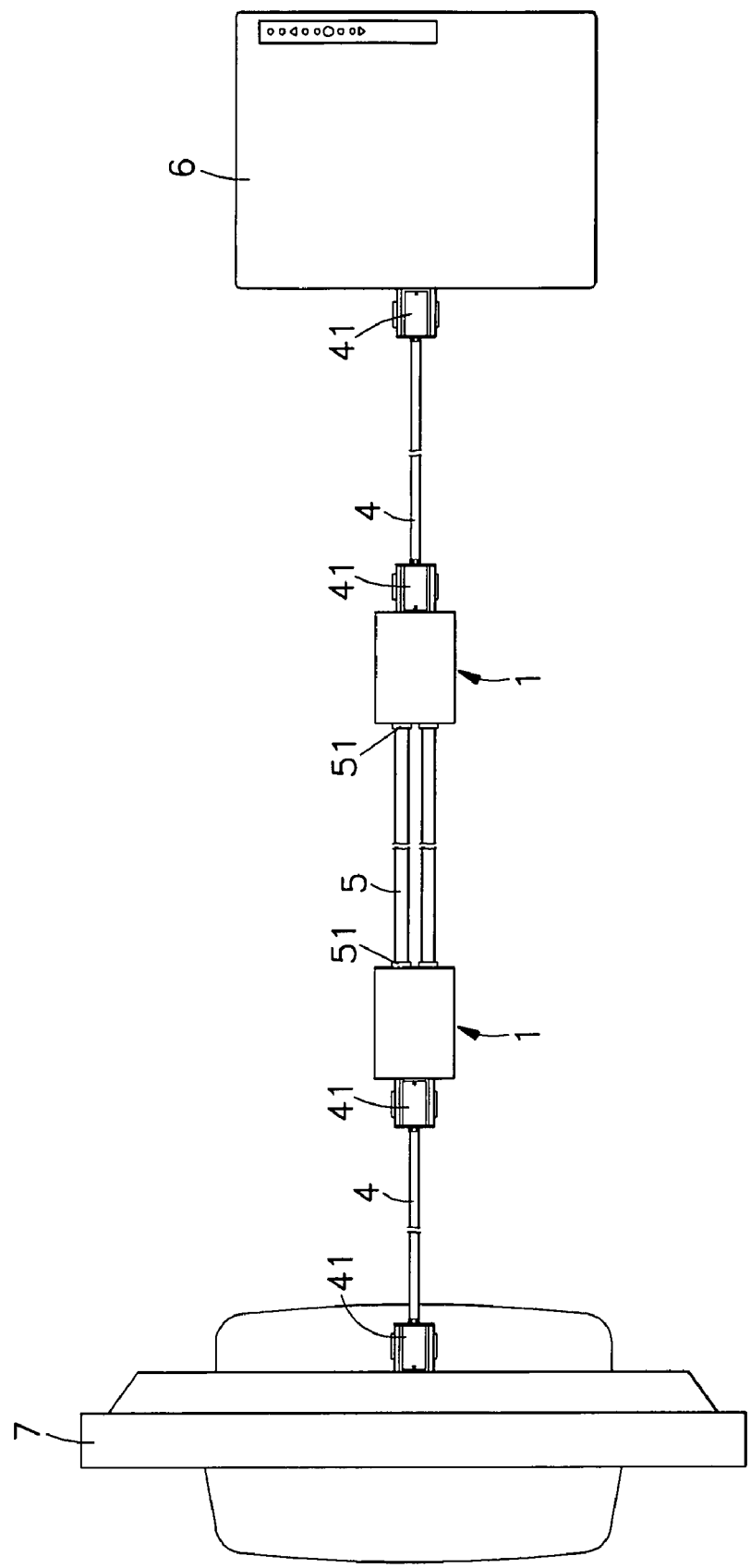
FIG. 7 is a schematic drawing showing an application example of the present invention.

FIG. 7 is a schematic drawing showing an application example of the present invention. According to this application example, one signal adapter box 1 in accordance with the first embodiment of the present invention (see FIG. 2) and one signal adapter box 1 in accordance with a second embodiment of the present invention (see FIG. 6) are connected together by RJ-type transmission cables 5 and respectively connected to a signal source 6 (for example, VCD/DVD player, projector or video recorder and player) and a video output device 7 (for example, LCD monitor) by a respective HDMI cable 4. By means of this arrangement, the signal source 6 and the video output device 7 could be installed in two remote places in a hall, plaza or exhibition center without worrying about signal attenuation. Because the effective signal transmission distance of a RJ-type transmission cable 5 reaches 100 meters, the use of RJ-type transmission cables 5 with the two signal adapter boxes and the HDMI cables 4 for signal transmission from the signal source 6 to the video output device 7 that are installed in two remote places prevents signal attenuation, and therefore the video output device 7 provides a quality output.

Further, because a RJ-type transmission cable 5 is much cheaper than a HDMI cable 4, using a RJ-type transmission cable 5 for a long distance signal transmission saves the cost.

Further, the signal adapter box of the present invention has a compact size for carrying and installation conveniently. By means of the use of the signal adapter box of the present invention, the user can extend the transmission cable arrangement distance subject to the condition of the exhibition hall, plaza or center. Further, the signal adapter box is strong and tough, suitable for installation in a passage. It does not break when frequently stepped by people visiting the exhibition.

Referring to FIGS. 1 and 2 again, the base frame 11 of the housing 1 has a substantially U-shaped profile. The first opening 13 and the second opening 14 are respectively located at the vertically extending front and rear upright walls of the base frame 11. The base frame 11 further has a plurality of upright lugs 16 symmetrically disposed at the two opposite lateral sides. Each upright lug 16 has a screw hole 161. The cover 12 is a substantially U-shaped plate member, having a plurality of mounting through holes 17 cut through the two opposite sidewalls corresponding to the screw holes 161 on the upright lugs 16 of the base frame 11. The aforesaid insertion hole 15 is located at one sidewall of the cover 12. The cover 12 is capped on the base frame 11, and fastening members, for example, screws 18 are respectively inserted through the mounting through holes 17 of the cover 12 and threaded into the screw holes 161 on the upright lugs 16 of the base frame 11 to affix the cover 12 to the base frame 11. Before fastening the cover 12 to the base frame 11, the electric module 2 is mounted in the base frame 11 to have the HDMI jack 22 and the RJ-type jacks 23 be respectively abutted against the first opening 13 and the second opening 14 of the base frame 11. Thereafter, the cover 12 is fastened to the base frame 11 to have the insertion hole 15 be abutted against the power jack 26.

As stated above, the invention provides a signal adapter box for connection between a signal source and a video output device at remote places for transmitting an video signal from the signal source to the video output device. The signal adapter box comprises a housing 1, and an electric module 2 mounted in an accommodation chamber 10 defined within the housing 1. The electric module 2 comprises a HDMI jack 22 at one side for the connection of a HDMI cable 4, at least one RJ-type jack 23 at an opposing side for the connection of a respective RJ-type cable 5. Further, a processor chip 24 may be installed in the electric module 2 to compensate and amplify the signal that is inputted into the HDMI jack 22, and then to output the processed signal to the at least one RJ-type jack 23 for output. By means of the application of the present invention, the signal source and the video output device can be installed in two remote places, and the signal quality can be well controlled.

Although a particular embodiment of the invention has been described in detail for purposes of illustration, various modifications and enhancements may be made without departing from the spirit and scope of the invention.

What the invention claimed is:

1. A signal adapter box comprising:
   a housing formed of a base frame and a cover, said housing having an accommodation chamber defined within said base frame and said cover, a first opening for the insertion of a HDMI (high definition multimedia interface) plug and a second opening for the insertion of at least one RJ-type plug; and
   an electric module mounted in said accommodation chamber inside said housing, said electric module comprising a circuit board, a HDMI (high definition multimedia interface) jack mounted on said circuit board and abutted against said first opening of said housing for receiving a HDMI plug of a HDMI cable, and at least one RJ-type jack mounted on said circuit board for signal transmission with said HDMI jack and abutted against said second opening of said housing for receiving a RJ-type plug of a RJ-type transmission cable respectively.

2. The signal adapter box as claimed in claim 1, wherein said housing is made of a light transmissive material.

3. The signal adapter box as claimed in claim 1, wherein said cover is made of a light transmissive material.

4. The signal adapter box as claimed in claim 1, wherein said electric module further comprises a processor chip mounted in said circuit board and electrically connected with said HDMI jack and said at least one RJ-type jack for compensating and amplifying a signal.

5. The signal adapter box as claimed in claim 4, wherein said electric module further comprises at least one light emitting device installed in said circuit board and controllable by said processor chip to indicate the signal transmission status of the signal adapter box.

6. The signal adapter box as claimed in claim 1, wherein said housing has an insertion hole for the insertion of a power output plug of a power adapter; said electric module comprises a power jack installed in said circuit board and electrically connected to said HDMI jack and said at least one RJ-type jack and abutted against said insertion hole of said housing for receiving a power output plug of a power adapter.

7. The signal adapter box as claimed in claim 1, wherein said base frame of said housing has a plurality of upright lugs, said upright lugs each having a screw hole; said cover of said housing has a plurality of mounting through holes respectively fastened to said screw holes of said upright lugs with a respective fastening member.

8. The signal adapter box as claimed in claim 1, wherein the first opening and second opening of said housing are respectively located on a front side and a rear side of said housing.

* * * * *